US012777483B2

(12) United States Patent
Qin et al.

(10) Patent No.: US 12,777,483 B2
(45) Date of Patent: Oct. 27, 2026

(54) ADAPTIVE ADJUSTMENT METHOD AND APPARATUS FOR DOWNLINK CONTROL CHANNEL RESOURCES, AND STORAGE MEDIUM

(71) Applicant: ZTE Corporation, Shenzhen (CN)

(72) Inventors: Yinkang Qin, Shenzhen (CN); Jiangyun Zhou, Shenzhen (CN); Meiying Wang, Shenzhen (CN); Lu Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 266 days.

(21) Appl. No.: 18/634,006

(22) Filed: Apr. 12, 2024

(65) Prior Publication Data

US 2024/0292414 A1 Aug. 29, 2024

Related U.S. Application Data

(63) Continuation of application No. PCT/CN2022/124166, filed on Oct. 9, 2022.

(30) Foreign Application Priority Data

Oct. 13, 2021 (CN) .......................... 202111191069.3

(51) Int. Cl.

*H04W 72/1273* (2023.01)
*H04W 72/02* (2009.01)
*H04W 72/0446* (2023.01)

(52) U.S. Cl.

CPC ....... *H04W 72/1273* (2013.01); *H04W 72/02* (2013.01); *H04W 72/0446* (2013.01)

(58) Field of Classification Search

None

See application file for complete search history.

(56) References Cited

U.S. PATENT DOCUMENTS 12,446,022 B2 10/2025 Khoshnevisan et al.
2015/0263818 A1 9/2015 Guo et al.
(Continued)

FOREIGN PATENT DOCUMENTS

CN 111148259 A 5/2020
CN 112752348 A 5/2021
(Continued)

OTHER PUBLICATIONS

International Search Report and Written Opinion for International Application No. PCT/CN2022/124166, mailed on Nov. 28, 2022, 8 pages with English translation.
(Continued)

*Primary Examiner* — Anh Vu H Ly
(74) *Attorney, Agent, or Firm* — Ashurst Perkins Coie US LLP

(57) ABSTRACT

Provided are an adaptive adjustment method and apparatus for downlink control channel resources, and a storage medium. The adaptive adjustment method includes: determining a number and positions of physical downlink control channel (PDCCH) resource blocks in a PDCCH resource pool; in response to determining that PDCCH resources are allocated to a user equipment (UE), determining a target PDCCH resource block from the PDCCH resource pool based on the number and positions of the PDCCH resource blocks and a size of a resource demand load; allocating the target PDCCH resource block to the UE; and notifying the UE of a time-domain symbol corresponding to the target PDCCH resource block through a search space.

19 Claims, 5 Drawing Sheets

(56) References Cited

U.S. PATENT DOCUMENTS

| | | | | |
|---|---|---|---|---|
| 2021/0105752 | A1* | 4/2021 | Taherzadeh Boroujeni | H04W 72/23 |
| 2021/0168809 | A1 | 6/2021 | Sun et al. | |
| 2021/0314950 | A1 | 10/2021 | Lin et al. | |
| 2022/0022176 | A1* | 1/2022 | Chen | H04W 68/02 |
| 2022/0240187 | A1* | 7/2022 | Guo | H04W 52/0229 |
| 2022/0338201 | A1* | 10/2022 | Jing | H04W 72/20 |

FOREIGN PATENT DOCUMENTS

| | | | |
|---|---|---|---|
| CN | 113497699 | A | 10/2021 |
| JP | 2010-114781 | A | 5/2010 |
| JP | 2024-510609 | A | 3/2024 |
| WO | 2018137517 | A1 | 8/2018 |
| WO | 2018204886 | A1 | 11/2018 |
| WO | 2020024202 | A1 | 2/2020 |

OTHER PUBLICATIONS

Guangdong Oppo Mobile Telecom, "Search space design consideration for NR PDCCH with BF," 3GPP TSG RAN WG1 meeting #89, R1-1707705, Hangzhou, P.R. China, May 15-19, 2017, 8 pages.

European Search Report issued in EP Patent Application No. 22880240.1, dated Jan. 13, 2025, 10 pages.

Indian Examination Report issued in IN Patent Application No. 202417036441, dated May 21, 2026, 7 pages.

Japanese notice of allowance issued in JP Patent Application No. 2024-522573, dated May 12, 2026, 3 pages.

* cited by examiner

ADAPTIVE ADJUSTMENT METHOD AND APPARATUS FOR DOWNLINK CONTROL CHANNEL RESOURCES, AND STORAGE MEDIUM

CROSS-REFERENCE TO RELATED APPLICATION(S)

This application is a continuation of International Patent Application No. PCT/CN2022/124166, filed on Oct. 9, 2022, which claims priority to Chinese Patent Application No. 202111191069.3, filed on Oct. 13, 2021. The entire contents of the before-mentioned patent applications are incorporated by reference as part of the disclosure of this application.

TECHNICAL FIELD

The present disclosure relates to the field of communication technologies, and in particular, to an adaptive adjustment method and apparatus for downlink control channel resources, and a storage medium.

BACKGROUND

A physical downlink control channel (PDCCH) is configured to send scheduling control information. A user equipment (UE) may receive physical downlink shared channel (PDSCH) data or send physical uplink shared channel (PUSCH) data at indicated time based on the scheduling control information. In a fifth-generation (5G) new radio (NR) system, PDCCH resources are flexibly configured through a control-resource set (CORESET) and a search space.

As the number of UEs connected to the 5G NR system increases, the fixed configuration solution for the PDCCH resources may lead to a mismatch between PDCCH resource demands of the UEs and the PDCCH resources of a cell. An existing adaptive adjustment technology for the PDCCH resources is mainly achieved by changing the quantities of PDCCH time-domain symbols of all the UEs in the cell. However, the PDCCH resource configuration and change of the 5G NR system need to be notified to the UEs through a reallocation message. If the quantities of the PDCCH time-domain symbols of all the UEs in the cell are changed, all the UEs need to be reallocated, which can lead to a signaling storm.

SUMMARY

The following is a summary of the theme described in detail here. This summary is not intended to limit the protection scope of the claims.

Embodiments of the present disclosure provide an adaptive adjustment method and apparatus for downlink control channel resources, and a storage medium.

In a first aspect, the embodiments of the present disclosure provide an adaptive adjustment method for downlink control channel resources, including: determining a number and positions of physical downlink control channel (PDCCH) resource blocks in a PDCCH resource pool; if PDCCH resources are allocated to a user equipment (UE), determining a target PDCCH resource block from the PDCCH resource pool based on the number and positions of the PDCCH resource blocks and a size of a resource demand load; allocating the target PDCCH resource block to the UE;

and notifying the UE of a time-domain symbol corresponding to the target PDCCH resource block through a search space.

In a second aspect, the embodiments of the present disclosure provide an adaptive adjustment apparatus for downlink control channel resources, including at least one processor and a memory configured to achieve communication connection with the at least one processor. The memory stores instructions that are executed by the at least one processor; and the instructions, when executed by the at least one processor, cause the at least one processor to implement the adaptive adjustment method described in the first aspect.

In a third aspect, the embodiments of the present disclosure further provide a computer-readable storage medium. The computer-readable storage medium stores computer-executable instructions, and the computer-executable instructions are used for causing a computer to implement the adaptive adjustment method described in the first aspect.

Other features and advantages of the present disclosure will be elaborated in subsequent specification, and will be partially apparent from the specification or understood through the implementation of the present disclosure. The objectives and other advantages of the present disclosure can be achieved and obtained through the structures pointed out in the specification, claims, and accompanying drawings.

BRIEF DESCRIPTION OF THE DRAWINGS

The accompanying drawings are intended to provide a further understanding of the technical solutions of the present disclosure disclosure and constitute a part of this specification. The accompanying drawings and the examples of the present disclosure are used together to explain the technical solutions of the present disclosure rather than constituting a limitation on the technical solutions of the present disclosure.

DETAILED DESCRIPTION OF EMBODIMENTS

In order to make the objectives, technical solutions, and advantages of the present disclosure clearer, the following is a further detailed explanation of the present disclosure in conjunction with the accompanying drawings and embodiments. It should be understood that the specific embodiments described here are only intended to explain the present disclosure and are not intended to limit the present disclosure.

In the early stage of 5G network construction, due to a small number of UEs in a network, PDCCH resources can be fixedly configured according to a planned number of users and a bandwidth of a cell. At this time, a base station always occupies a fixed number of PDCCH resources. However, as the number of UEs accessing the base station increases, if the resources are allocated in the fixed configuration manner, the PDCCH resource demands of the UEs and the PDCCH resources of the cell mismatch. Therefore, the industry has adopted an adaptive method for PDCCH resources to solve the problem of mismatch between the PDCCH resource demands of the UEs and the PDCCH resources of the cell. Adaptation of the resources is achieved mainly by changing the number of PDCCH time-domain symbols of all the UEs of the cell. All the UEs can be notified through a control format indicator (CFI, indicating a change in the number of PDCCH symbols) in a 4G system, so that the PDCCH resources on a base station side are the same as those on the UEs, CFI is cancelled in 5G NR systems, and PDCCH resource configuration and changes need to be notified to the UEs through a reallocation message. If the quantities of the PDCCH time-domain symbols of all the UEs in the cell are changed, all the UEs need to be reallocated, which can lead to a signaling storm.

Based on this, the embodiments of the present disclosure provide an adaptive adjustment method and apparatus for downlink control channel resources, and a computer storage medium. On the base station side, how to allocate the resources for the UEs is determined based on resource allocation failure rates of PDCCH resource blocks, so as to automatically balance loads of the PDCCH resource blocks on the base station side, match the PDCCH resource demands of the UEs with the number of PDCCH resources in the cell, and effectively improve the utilization rate of spectrum resources.

Figure 1:
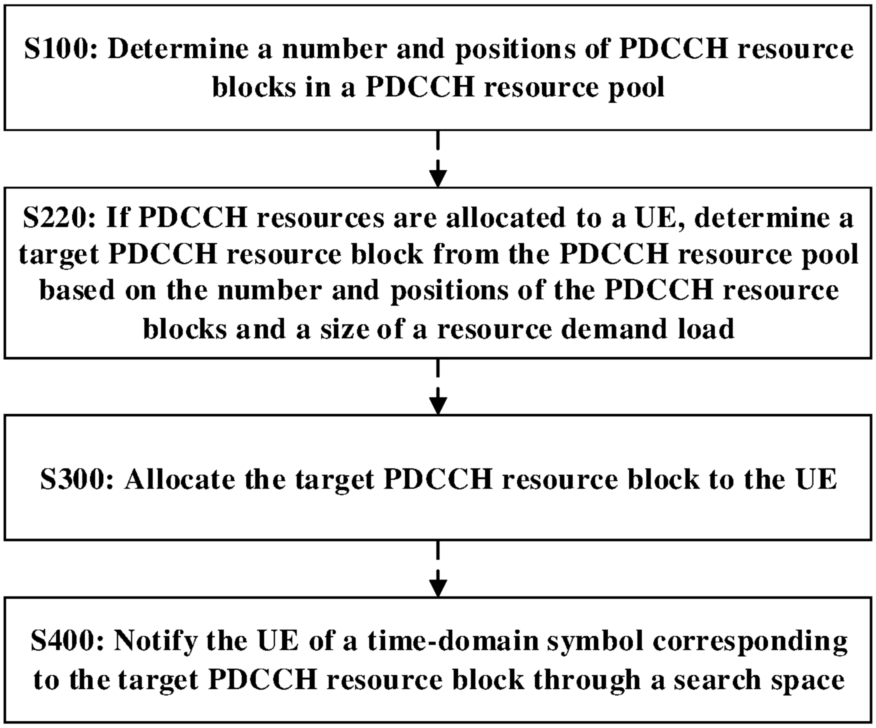
FIG. 1 is a flowchart of an overall method of an adaptive adjustment method for downlink control channel resources provided based on an embodiment of the present disclosure.

Referring to FIG. 1, the embodiments of the present disclosure provide an adaptive adjustment method for downlink control channel resources, including but not limited to S100, S200, S300, and S400 below.

S100, a number and positions of PDCCH resource blocks in a PDCCH resource pool are determined.

S200, if PDCCH resources are allocated to a UE, a target PDCCH resource block is determined from the PDCCH resource pool based on the number and positions of the PDCCH resource blocks and a size of a resource demand load.

S300, the target PDCCH resource block is allocated to the UE.

S400, the UE is notified of a time-domain symbol corresponding to the target PDCCH resource block through a search space.

Since 5G NR uses parameters that can be flexibly configured, such as PDCCH resource time-domain starting symbols, a number of symbols, frequency-domain starting positions, and frequency-domain sizes, to configure the PDCCH resources, based on this characteristic, the embodiments of the present disclosure select one of the PDCCH resource blocks from the PDCCH resource pool based on resource demand loads of the PDCCH resource blocks, and allocate it to the UE. For example, the target PDCCH resource block is automatically selected based on an indicator such as resource demands of the allocated UEs on the PDCCH resource blocks, so as to achieve reasonable allocation of the PDCCH resources.

In some cases, the PDCCH resource pool includes a plurality of PDCCH resource blocks that are arranged in sequence. These PDCCH resource blocks are in a one-to-one correspondence to a time-domain symbol and are sequenced according to sizes of the time-domain symbols. For example, the PDCCH resource pool includes a first PDCCH resource block and a second PDCCH resource block, the time-domain symbols corresponding to the first PDCCH resource block and the second PDCCH resource block are adjacent, and the time-domain symbol corresponding to the first PDCCH resource block is smaller than the time-domain symbol corresponding to the second PDCCH resource block.

In some cases, in S200, a target PDCCH resource block is selected, which can be achieved using the following:

the target PDCCH resource block with a resource allocation failure rate less than a first threshold value is determined based on the order of the time-domain symbols corresponding to the PDCCH resource blocks in the PDCCH resource pool, the resource allocation failure rate is determined based on a number of unsuccessfully allocated PDCCH resources on the PDCCH resource blocks.

Figure 2:
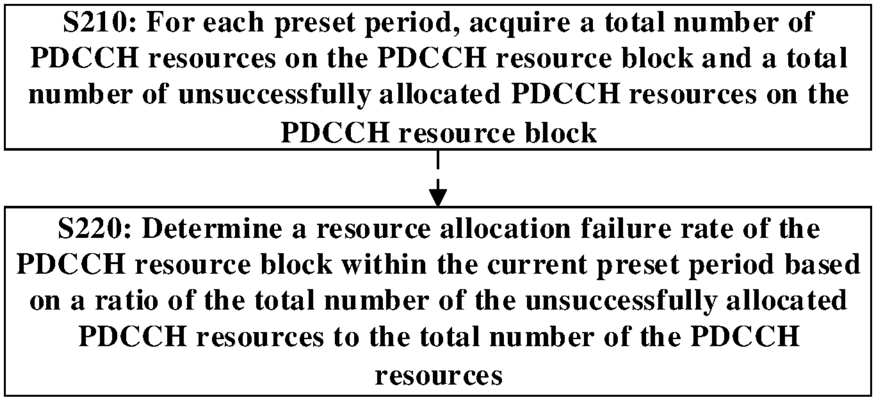
FIG. 2 is a flowchart of calculating a resource allocation failure rate provided based on an embodiment of the present disclosure.

According to the embodiments of the present disclosure, the first threshold value is set for all the PDCCH resource blocks in the PDCCH resource pool. The first threshold value is used for limiting allocation failure threshold values of the PDCCH resource blocks in the process of allocating the PDCCH resources to the UE. A case of an allocation failure is represented by a resource allocation failure rate of a PDCCH resource block. The resource allocation failure rate is calculated based on a number of unsuccessfully allocated resources on a PDCCH resource block. When an allocation failure occurs in the process that the PDCCH resource block allocates N resources to the UE, the number of the N resources is added to the number of the unsuccessfully allocated resources, thus obtaining a total number of the unsuccessfully allocated resources on the entire PDCCH resource block. As the resource state in the PDCCH resource pool on the base station side constantly changes, how to calculate the resource allocation failure rate needs to be determined. Referring to FIG. 2, in an optional case, the resource allocation failure rate can be calculated by the following:

S210, for each preset period, a total number of the PDCCH resources on the PDCCH resource block and a total number of the unsuccessfully allocated PDCCH resources on the PDCCH resource block are acquired.

S220, the resource allocation failure rate of the PDCCH resource block within the current preset period is determined based on a ratio of the total number of the unsuccessfully allocated PDCCH resources to the total number of the PDCCH resources.

By the above method, the resource allocation failure rate is calculated by a preset period, and the resource allocation failure rate in this embodiment represents a resource allocation failure situation of a PDCCH resource block within a certain period of time (the preset period). The total number of the unsuccessfully allocated PDCCH resources of the PDCCH resource block within the preset period is used as the numerator, and the total number of the PDCCH resources of the PDCCH resource block within the preset period is used as the denominator. The calculated ratio is the resource allocation failure rate. It can be understood that a duration of the preset period can be set as needed, such as 1 second and 3 seconds. Furthermore, within the preset period, the allocation situation of the PDCCH resources changes. Therefore, the resource allocation failure rate can be expressed as an average situation of the unsuccessfully allocated resources of a certain PDCCH resource block within a certain preset period.

Based on the resource allocation failure rate and the first threshold value mentioned above, during the allocation of the resources to the UE, the PDCCH resource block with the resource allocation failure rate less than the first threshold value is selected for resource allocation. In the embodiments of the present disclosure, in order to improve the resource utilization rate, the resource allocation failure rates of the PDCCH resource blocks are determined in sequence based on the order of the time-domain symbols corresponding to the PDCCH resource blocks. For example, if the resource allocation failure rate of the PDCCH resource block with the time-domain symbol of 0 is greater than the first threshold value, the PDCCH resource block with the time-domain symbol of 1 is selected to determine whether the resource allocation failure rate of the PDCCH resource block is less than the first threshold value. If yes, the resources are allocated to the UE on the PDCCH resource block with the time-domain symbol of 1; and if no, whether the PDCCH resource block with the time-domain symbol of 2 satisfies the condition is continued to be determined, and so on. In this way, the UEs can be intensively allocated to PDCCH resource blocks with smaller time-domain symbols, thereby preserving PDCCH resource blocks with larger time-domain symbols for being shared to a physical downlink shared channel (PDSCH).

Based on the above manner, the PDCCH resource block that can allocate the resources to the UE can be selected, and the PDCCH resource block is used as the target PDCCH resource block to send a configuration notification to the UE. In the 5G NR system, a control resource set (CORESET) can configure the number of the symbols of the PDCCH resources, the frequency-domain starting positions, and the frequency-domain sizes. The search space can configure the time-domain starting symbols of the PDCCH resources. Therefore, in the embodiments of the present disclosure, the time-domain symbol corresponding to the target PDCCH resource block can be notified to the UE through the search space. For example, the search space configured for the UE is determined first, and then a value of monitoringSymbolsWithinSlot in the search space is configured based on the time-domain symbol corresponding to the target PDCCH resource block. The monitoringSymbolsWithinSlot corresponds to the time-domain symbol. If which position in the monitoringSymbolsWithinSlot is 1, the resources on which time-domain starting symbol are used to be allocated to the UE. The UE can know a PDCCH configuration on the base station side based on the value of the above field in the search space.

Through the above adaptive adjustment method, the resources are automatically and reasonably allocated to the UE based on the resource allocation failure rates. In a scenario of many UEs, it can also be ensured that sufficient PDCCH resources can be provided to ensure the number of scheduled UEs, effectively improve the utilization rate of spectrums, bring a better network experience, achieve an optimal system capacity, and balance the number of scheduled users.

Figure 3:
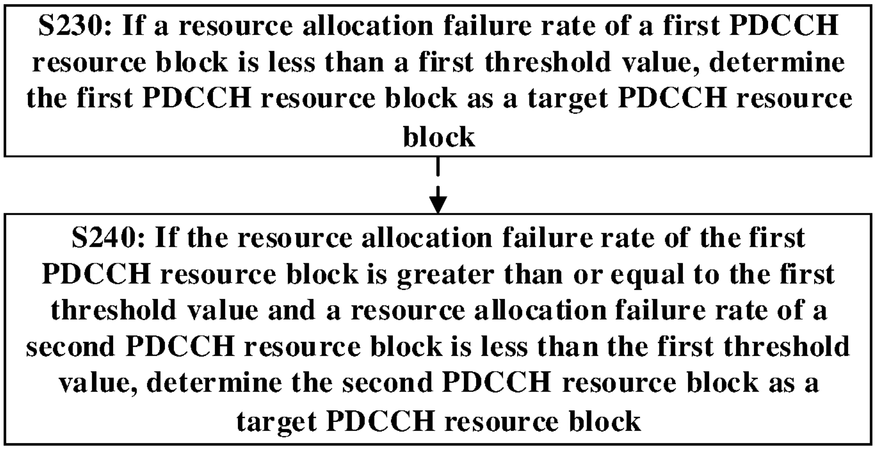
FIG. 3 is a flowchart of determining a target PDCCH resource block provided based on an embodiment of the present disclosure.

Assuming that the time-domain symbol of the first PDCCH resource block is 0 and the time-domain symbol of the second PDCCH resource block is 1, in S200 described above, the target PDCCH resource block with the resource allocation failure rate less than the first threshold value is determined based on the order of the time-domain symbols corresponding to the PDCCH resource blocks. Referring to FIG. 3, this step may be achieved in the following:

S230, if the resource allocation failure rate of the first PDCCH resource block is less than the first threshold value, the first PDCCH resource block is determined as the target PDCCH resource block.

S240, if the resource allocation failure rate of the first PDCCH resource block is greater than or equal to the first threshold value and the resource allocation failure rate of the second PDCCH resource block is less than the first threshold value, the second PDCCH resource block is determined as the target PDCCH resource block.

Since the first threshold value is global, during the allocation of the resources to the UE, the resource allocation failure rate of the PDCCH resource block corresponding to the time-domain symbol is determined based on the order of the time-domain symbols from small to large. If the resource allocation failure rate of the first PDCCH resource block is less than the first threshold value, the resources are allocated to the UE in the first PDCCH resource block. If the resource allocation failure rate of the first PDCCH resource block is greater than or equal to the first threshold value, whether the resource allocation failure rate of the second PDCCH resource block is greater than the first threshold value is determined. It can be understood that as the number of UEs for accessing increases, the resource allocation failure rates of the PDCCH resource blocks with the time-domain symbols of 0 in the PDCCH resource pool may first reach or exceed the first threshold value, and the resource allocation failure rates of the PDCCH resource blocks with the time-domain symbols of 1 may then reach or exceed the first threshold value, eventually causing the resource allocation failure rates of all the PDCCH resource blocks in the PDCCH resource pool to exceed the first threshold value. In this case, if resources need to be allocated to newly connected UEs, the following processing can be performed in the following:

- if the resource allocation failure rates of all the PDCCH resource blocks in the PDCCH resource pool are greater than or equal to the first threshold value, the PDCCH resource block with the smallest resource allocation failure rate is selected as the target PDCCH resource block; or,
- if the resource allocation failure rates of all the PDCCH resource blocks in the PDCCH resource pool are equal and are greater than or equal to the first threshold value, the PDCCH resource block with the smallest corresponding time-domain symbol is selected as the target PDCCH resource block.

According to the above, it can be seen that when the resource allocation failure rates of all the PDCCH resource blocks exceed the first threshold value, the PDCCH resource block with the smallest resource allocation failure rate is searched to allocate the resources to the UE. If the resource allocation failure rates of all the PDCCH resource blocks are the same, the PDCCH resource block with the smallest time-domain symbol (usually, the time-domain symbol is 0) is selected, according to the principle of a smallest time-domain symbol first, to allocate the resources to the UE.

It can be understood that before the resources are allocated to the UE, the resource situation on the base station side requires initializing configuration. In some examples, the base station configures a PDCCH resource pool of a current cell, and the PDCCH resource pool is a set of a plurality of PDCCH resource blocks. Lengths of time-domain symbols of all the PDCCH resource blocks can be configured to be the same or different, and all the PDCCH resource blocks occupy different time-domain symbol positions in one slot; and the number (which is usually 0) of allocated UEs of each PDCCH resource block is initialized, and then the number of the allocated UEs of each PDCCH resource block is updated according to an allocation situation of the PDCCH resource block.

Figure 4:
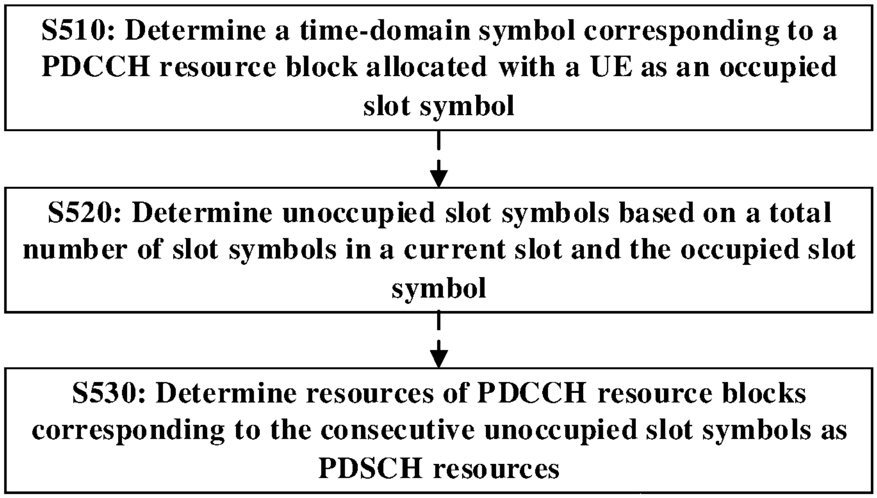
FIG. 4 is a flowchart of sharing a resource to a PDSCH provided based on an embodiment of the present disclosure.

Referring to FIG. 4, based on the above adaptive adjustment method, the UEs are intensively allocated to the PDCCH resource blocks with the smaller time-domain symbols, so the PDCCH resource blocks with the larger time-domain symbols can be shared resources of a PDSCH. For example, this can be achieved in the following:

S510, the time-domain symbol corresponding to the PDCCH resource block allocated with the UE is used as an occupied slot symbol.

S520, unoccupied slot symbols are determined based on a total number of slot symbols in a current slot and the occupied slot symbol.

S530, resources of the PDCCH resource blocks corresponding to the consecutive unoccupied slot symbols are used as PDSCH resources.

After the base station side is initialized, the number of the allocated UEs of each PDCCH resource block is dynamically updated later according to the allocation situation of PDCCH resource block. That is, when the PDCCH resource block is allocated to a UE, the number of the allocated UEs of the PDCCH resource block is added by one; and when the PDCCH resource block loses a UE, the number of the allocated UEs of the PDCCH resource block is subtracted by one, thereby counting the various PDCCH resource blocks occupied by the existing UEs and determining the time-domain symbols occupied by the PDCCH resources of the cell. The time-domain symbols not occupied by the PDCCH resources of the cell can be determined according to states of all the PDCCH resource blocks in the PDCCH resource pool. In the related technology, PDSCH scheduling requires continuous time-domain symbol resources. Therefore, based on the above adaptive adjustment method, the PDCCH resource blocks with the smaller time-domain symbols are allocated first, and the subsequent time-domain symbols can be continuously used by the PDSCH resources.

It is worth noting that in the process of UE allocation by the base station, after the peak period of UE accessing, the number of the UEs in the PDCCH resource pool is relatively small, and a fewer of resources are occupied. However, during the peak period, a portion of the UEs are allocated to the PDCCH resource blocks with the larger time-domain symbols. In order to improve the utilization rate of spectrum resources, the UEs can be reallocated under certain conditions. For example:

If a resource utilization rate of the PDCCH resource pool is less than a second threshold value, a UE on a PDCCH resource block that does not have symbol 0 is reallocated to a symbol in front of the PDCCH resource block that does not have symbol 0. The resource utilization rate is determined based on a number of successfully allocated PDCCH resources in the PDCCH resource pool.

The resource utilization rate is used for representing an occupancy of the resources in the PDCCH resource pool. When the resource utilization rate is less than the second threshold value, it indicates that only a small number of resources in the PDCCH resource pool are occupied. In order to plan the spectrum resources occupied by the UEs, reallocation performed on the UEs is triggered. The scattered UEs are concentrated on the PDCCH resource blocks with the time-domain symbols of 0, or the UEs can be allocated to the time-domain symbols in front of the PDCCH resource blocks with the UEs. Thus, continuous PDCCH resource blocks with larger time-domain symbols are preserved for being shared to the PDSCH.

Figure 5:
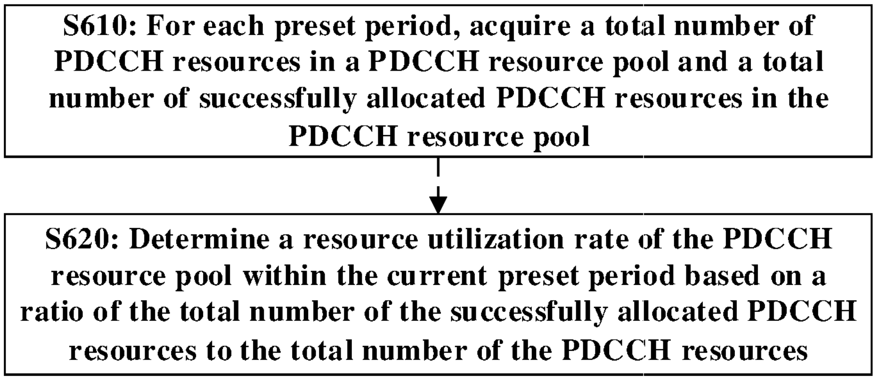
FIG. 5 is a flowchart of calculating a resource utilization rate provided based on an embodiment of the present disclosure.

Similar to the resource allocation failure rate, the resource utilization rate is also calculated based on the resource situation within certain time. Specifically, referring to FIG. 5:

S610, for each preset period, a total number of the PDCCH resources in the PDCCH resource pool and a total number of the successfully allocated PDCCH resources in the PDCCH resource pool are acquired.

S620, the resource utilization rate of the PDCCH resource pool within the current preset period is determined based on a ratio of the total number of the successfully allocated PDCCH resources to the total number of the PDCCH resources.

The resource utilization rate is calculated by taking the PDCCH resource pool as an object. The total number of the successfully allocated PDCCH resources in the PDCCH resource pool is used as the numerator, and the total number of the PDCCH resources in the PDCCH resource pool is used as the denominator. The ratio is used as the resource utilization rate of the PDCCH resource pool in the current preset period. It can be understood that a duration of the preset period can be set as needed, such as 1 second and 3 seconds. Furthermore, within the preset period, the allocation situation of the PDCCH resources changes. Therefore, the resource utilization rate can be expressed as an average situation of the successfully allocated resources of the PDCCH resources within a certain preset period.

It is worth noting that the preset period of the resource allocation failure rate and the preset period of the resource utilization rate can be the same, and the two values can be calculated simultaneously. Therefore, the base station side automatically updates the resource allocation failure rate and the resource utilization rate within each preset period, thereby achieving adaptive adjustment of the PDCCH resources and sharing of the PDCCH resources by the PDSCH, effectively improving the utilization rate of spectrums, bringing a better network experience, achieving an optimal system capacity, and balancing the number of scheduled users.

Figure 6:
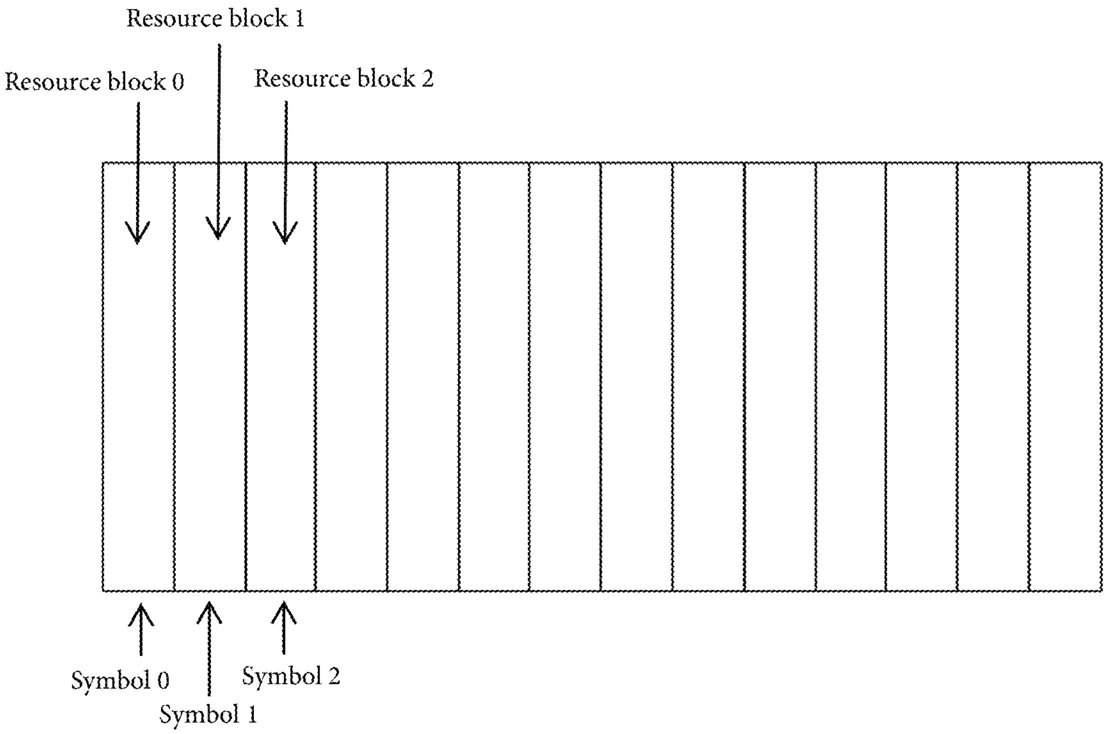
FIG. 6 is a diagram of configuration of a PDCCH resource pool provided based on an example of the present disclosure.

The adaptive adjustment method for the downlink control channel resources of the embodiments of the present disclosure will be explained below by actual examples:

The base station side performs adaptive configuration on the PDCCH resources, and a specific process is as follows:

(1) A configuration of a PDCCH resource pool of a current cell is acquired. As shown in FIG. 6, the previous three PDCCH resource blocks in the PDCCH resource pool are PDCCH resource block 0, PDCCH resource block 1, and PDCCH resource block 2, with corresponding slot starting symbols of 0, 1, and 2, respectively.

(2) The number of allocated UEs of each PDCCH resource block in the above PDCCH resource pool is initialized to be 0, and the number of the allocated UEs of each PDCCH resource block is dynamically updated later according to an allocation situation of the PDCCH resource block, that is, when the PDCCH resource block is allocated to a UE, the number of the allocated UEs of the PDCCH resource block is added by one; and when the PDCCH resource block loses a UE, the number of the allocated UEs of the PDCCH resource block is subtracted by one.

(3) A PDCCH resource allocation failure rate is used to reflect a resource demand of the UEs on each PDCCH resource block. The PDCCH resource allocation failure rate of each PDCCH resource block and the utilization rate of the PDCCH resource pool of the cell are initialized to be 0. At each subsequent preset period point, the PDCCH resource allocation failure rate of each PDCCH resource block and the utilization rate of the PDCCH resource pool of the cell are updated according to scheduling situations of all the UEs within a preset period.

Where:

The PDCCH resource allocation failure rate=the total number of unsuccessfully allocated PDCCH resources on the PDCCH resource block within the period/the total number of resources of the PDCCH resource block within the period.

The utilization rate of the PDCCH resource pool=the total number of successfully allocated PDCCH resources on all the PDCCH resource blocks within the period/the total number of the resources of all the PDCCH resource blocks within the period.

(4) When it is necessary to allocate a PDCCH resource block to a UE, one PDCCH resource block in the resource pool is allocated to the UE based on the PDCCH resource allocation failure rate of each PDCCH resource block. When the resource allocation failure rate of PDCCH resource block 0 is less than threshold I (namely, the first threshold value mentioned above), PDCCH resource block 0 is allocated to the UE. When the resource allocation failure rate of PDCCH resource block 0 is greater than or equal to threshold I, whether PDCCH resource block 1 can be allocated to the UE needs to be determined, and the determining logic is the same as the logic of allocating PDCCH resource block 0. The processing performed on PDCCH resource block 2 is in the same way. If the PDCCH resource allocation failure rates of all the PDCCH resource blocks exceed threshold I, the PDCCH resource block with the smallest resource allocation failure rate is selected and allocated to the UEs. After the PDCCH resource block is selected for the UE, the UE needs to be notified through CORESET and a search space. Configurations of monitoringSymbolsWithinSlot of the search spaces of different resource blocks are as shown in Table 1:

TABLE 1

Correspondence relationships between the PDCCH resource blocks and the values of monitoringSymbolsWithinSlot

| PDCCH resource block | Value of monitoringSymbolsWithinSlot |
|---|---|
| 0 | 10000000000000 |
| 1 | 01000000000000 |
| 2 | 00100000000000 |

For example, threshold I is set to be 0.10, and a scenario is initially constructed for the cell. When a UE initiates access, the PDCCH resource allocation failure rates of all the resource blocks are 0. Since the resource allocation failure rate of PDCCH resource block 0 is less than threshold I, resource block 0 is selected and allocated to the UE, and the monitoringSymbolsWithinSlot of the search space configured for the UE is filled in as 10000000000000.

For another example, if threshold I is configured to be 0.10, when a UE initiates access, the PDCCH resource allocation failure rates of PDCCH resource blocks 0, 1, and 2 are 0.20, 0.08, and 0, respectively. If the resource allocation failure rate of PDCCH resource block 0 exceeds threshold I, the resource allocation failure rate of PDCCH resource block 1 is compared with threshold I. Since the resource allocation failure rate of PDCCH resource block 1 is less than threshold I, resource block 1 is selected and allocated to the UE, and the monitoringSymbolsWithinSlot of the search space configured for the UE is filled in as 01000000000000.

(5) Symbols occupied by the PDCCH resources of the cell can be determined based on the number of the allocated UEs of each PDCCH resource block in the maintained PDCCH resource pool. The PDSCH resources can use time-domain resources corresponding to unoccupied PDCCH resources.

Figure 7:
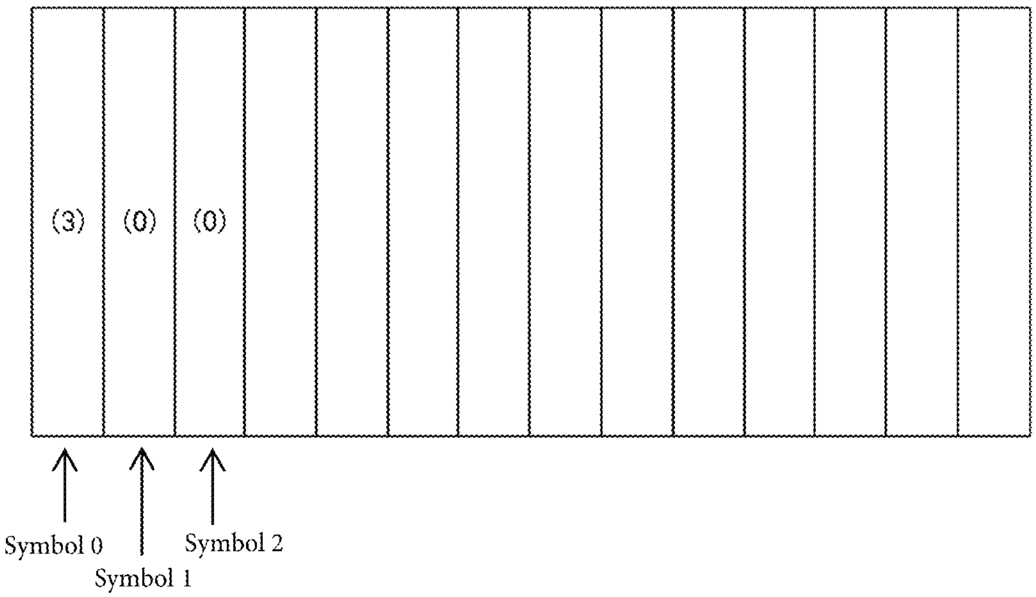
FIG. 7 is a diagram I of an adaptive configuration scenario of a PDCCH provided based on an example of the present disclosure.

For example, as shown in FIG. 7, if the quantities of the allocated UEs of PDCCH resource blocks 0, 1, and 2 are 3, 0, and 0, respectively, time-domain symbol 1 occupied by the PDCCH resources of the cell, and PDCCH resource blocks 1 and 2 are not allocated to the UE, and can be used as PDSCH resources. This avoids a waste of PDCCH resources caused by a fixed configuration of multiple symbols and improves the utilization rate of downlink spectrums.

Figure 8:
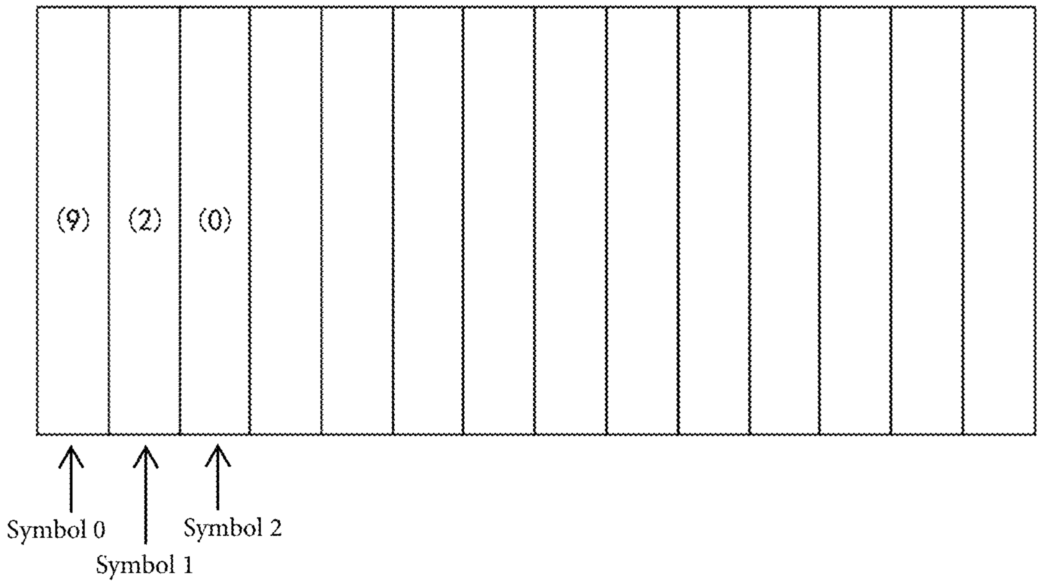
FIG. 8 is a diagram II of an adaptive configuration scenario of a PDCCH provided based on an example of the present disclosure.

For still another example, as shown in FIG. 8, if the quantities of the allocated UEs of PDCCH resource blocks 0, 1, and 2 are 9, 2, and 0, respectively, PDCCH resource block 2 is not allocated to the UE, and this PDCCH resource block can be used as a PDSCH resource. In this case, the PDCCH resources use the previous two time-domain symbols (time-domain symbols 0 and 1), and the PDSCH resource can use the last 12 symbols (except for 0 and 1), which not only meets the PDCCH resource demands of scheduled users, but also fully use spectrum resources as PDSCH resources.

(6) Within a period of time, when the utilization rate of the PDCCH resource pool of the cell is less than threshold II (namely, the second threshold value mentioned above), a UE on a PDCCH resource block that does not have symbol 0 can be reallocated. The selection of a PDCCH resource block after the reallocation is initiated can refer to Step (4) above.

For example, threshold II is set to be 0.30. Within a certain period of time, if the quantities of the allocated UEs of PDCCH resource blocks 0, 1, and 2 are 0, 5, and 0, respectively, the utilization rate of the PDCCH resource pool is 0.20. Since the PDCCH resources continuously occupy symbol 1 and the utilization rate of the PDCCH resource pool is less than threshold II, it is possible to trigger reallocation of five UEs of PDCCH resource block 1.

Threshold I and threshold II described above can be determined by combining simulation data and an actual test, and are configured by network optimization or planning personnel. According to the adaptive adjustment method for the PDCCH resources provided in this example, the UEs are distributed to a plurality of PDCCH resource blocks based on the PDCCH resource allocation failure rates of all the PDCCH resource blocks, which matches the PDCCH resource demands with the number of the PDCCH resources of the cell. Meanwhile, the number of available PDSCH resources is determined based on the distribution of the quantities of the allocated UEs of the PDCCH resource blocks, achieving a reasonable allocation of the PDCCH resources and the PDSCH resources.

The embodiments of the present disclosure further provide an adaptive adjustment apparatus for downlink control channel resources, including at least one processor and a memory configured to achieve communication connection with the at least one processor. The memory stores instructions that are executed by the at least one processor; and the instructions, when executed by the at least one processor, cause the at least one processor to implement the foregoing adaptive adjustment method for the downlink control channel resources.

Figure 9:
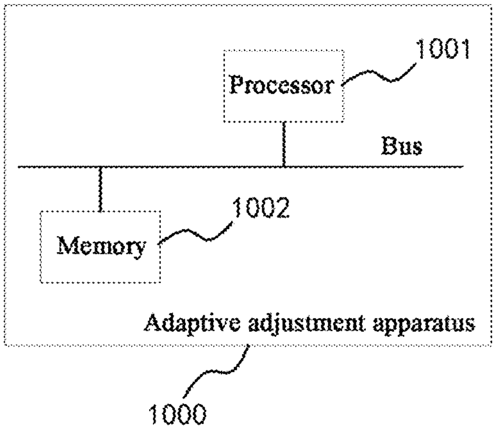
FIG. 9 is a schematic structural diagram of an adaptive adjustment apparatus provided based on an example of the present disclosure.

Referring to FIG. 9, by way of example, a control processor 1001 and a memory 1002 in the adaptive adjustment apparatus 1000 can be connected by a bus. The memory 1002, as a non-transient computer-readable storage medium, can be configured to store non-transient software programs and non-transient computer-executable programs. In addition, the memory 1002 may include a high-speed random access memory and may also include a non-transient memory, such as at least one disk memory, a flash memory device, or other non-transient solid-state storage devices. In some implementations, the memory 1002 optionally includes a memory remotely arranged with respect to the processor 1001. These remote memories can be connected to the adaptive adjustment apparatus 1000 through a network. Examples of the above network include, but are not limited to, Internets, intranets, local area networks, mobile communication networks, and combinations thereof.

A person skilled in the art may understand that the structures shown in FIG. 9 do not constitute a limitation on the adaptive adjustment apparatus 1000, and the apparatus may include more or fewer components than those shown in the figure, or some components may be combined, or a different component deployment may be used.

The embodiments of the present disclosure further provide a computer-readable storage medium. The computer-readable storage medium stores computer-executable instructions. The computer-executable instructions are executed by one or more control processors, for example, by one control processor 1001 in FIG. 9, which can cause the one or more control processors to implement the adaptive adjustment method for the downlink control channel resources in the above method embodiment, for example, to perform S100 to S400 in FIGS. 1, S210 to S220 of the method in FIGS. 2, S230 to S240 of the method in FIGS. 3, S510 to S530 of the method in FIG. 4, and S610 to S620 of the method in FIG. 5.

The apparatus embodiment described above is only illustrative, and the units described as separate components may or may not be physically separated, that is, they can be located in one place or distributed to multiple network units. Some or all of the modules are selected based on actual needs to achieve the objective of the solution of this embodiment.

A person of ordinary skill in the art can understand that all or some steps and systems in the disclosed method mentioned above can be implemented as software, firmware, hardware, and their appropriate combinations. Some or all physical components can be implemented as software executed by a processor, such as a central processing unit, a digital signal processor, or a microprocessor, or as hardware, or as integrated circuits, such as dedicated integrated circuits. Such software can be distributed on a computer-readable medium. The computer-readable medium may include a computer storage medium (or non-transient medium) and a communication medium (or transient medium). As known to a person of ordinary skill in the art, the term, computer storage medium, includes volatile and non-volatile media, and removable and non-removable media implemented by using any method or technology used for storing information (such as computer-readable instructions, data structures, program modules, or other data). The computer storage media include but are not limited to a random access memory (RAM), a read only memory (ROM), an electrically erasable programmable read only memory (EEPROM), a flash memory or other storage technologies, a CD-ROM, a digital versatile disc (DVD) or other optical disc storages, a cassette, a magnetic tape, a disk storage or other magnetic storage devices, or any other media that can be used for storing desired information and can be accessed by computers. In addition, it is well known to a person of ordinary skill in the art that the communication media typically include computer-readable instructions, data structures, program modules, or other data in modulated data signals such as carriers or other transmission mechanisms, and may include any information delivery medium.

The above is a specific explanation of the preferred implementations of the present application, but the present application is not limited to the above implementations. Those skilled in the art can also make various equivalent transformations or replacements without departing from the spirit of the present application. These equivalent transformations or replacements shall all fall within the scope of the claims of the present application.

We claim:

1. An adaptive adjustment method for downlink control channel resources, comprising:

determining a number and positions of physical downlink control channel (PDCCH) resource blocks in a PDCCH resource pool;

in response to determining that PDCCH resources are allocated to a user equipment (UE), determining a target PDCCH resource block from the PDCCH resource pool based on the number and positions of the PDCCH resource blocks and a size of a resource demand load;

allocating the target PDCCH resource block to the UE; and notifying the UE of a time-domain symbol corresponding to the target PDCCH resource block through a search space;

wherein the notifying the UE of a time-domain symbol corresponding to the target PDCCH resource block through a search space comprises:

determining the search space configured for the UE; and configuring a value of monitoringSymbolsWithinSlot in the search space based on the time-domain symbol corresponding to the target PDCCH resource block.

2. The adaptive adjustment method of claim 1, wherein the PDCCH resource pool comprises a first PDCCH resource block and a second PDCCH resource block, and the time-domain symbol corresponding to the first PDCCH resource block is smaller than the time-domain symbol corresponding to the second PDCCH resource block.

3. The adaptive adjustment method of claim 1, further comprising:

determining the time-domain symbol corresponding to the PDCCH resource block allocated to the UE as an occupied slot symbol;

determining unoccupied slot symbols based on a total number of slot symbols in a current slot and the occupied slot symbol; and determining resources of the PDCCH resource blocks corresponding to consecutive unoccupied slot symbols as physical downlink shared channel (PDSCH) resources.

4. The adaptive adjustment method of claim 2, wherein the number and positions of the PDCCH resource blocks correspond to a number and order of the time-domain symbols, respectively, and the determining a target PDCCH resource block from the PDCCH resource pool based on the number and positions of the PDCCH resource blocks and a size of a resource demand load comprises:

determining, based on the order of the time-domain symbols corresponding to the PDCCH resource blocks in the PDCCH resource pool, the target PDCCH resource block with a resource allocation failure rate less than a first threshold value, wherein the resource allocation failure rate is determined based on a number of unsuccessfully allocated PDCCH resources on the PDCCH resource blocks.

5. The adaptive adjustment method of claim 4, wherein the resource allocation failure rate is determined based on the following:

acquiring, for each preset period, a total number of the PDCCH resources on the PDCCH resource block and a total number of the unsuccessfully allocated PDCCH resources on the PDCCH resource block; and determining the resource allocation failure rate of the PDCCH resource block within a current preset period based on a ratio of the total number of the unsuccessfully allocated PDCCH resources to the total number of the PDCCH resources.

6. The adaptive adjustment method of claim 4, wherein the determining, based on the order of the time-domain symbols corresponding to the PDCCH resource blocks in the PDCCH resource pool, the target PDCCH resource block with the resource allocation failure rate less than the first threshold value comprises:

in response to determining that the resource allocation failure rate of the first PDCCH resource block is less than the first threshold value, determining the first PDCCH resource block as the target PDCCH resource block; and in response to determining that the resource allocation failure rate of the first PDCCH resource block is greater than or equal to the first threshold value and the resource allocation failure rate of the second PDCCH resource block is less than the first threshold value, determining the second PDCCH resource block as the target PDCCH resource block.

7. The adaptive adjustment method of claim 4, wherein the determining, based on the order of the time-domain symbols corresponding to the PDCCH resource blocks in the PDCCH resource pool, the target PDCCH resource block with the resource allocation failure rate less than the first threshold value comprises:

in response to determining that the resource allocation failure rates of all the PDCCH resource blocks in the PDCCH resource pool are greater than or equal to the first threshold value, selecting the PDCCH resource block with a smallest resource allocation failure rate as the target PDCCH resource block; or, in response to determining that the resource allocation failure rates of all the PDCCH resource blocks in the PDCCH resource pool are equal and are greater than or equal to the first threshold value, selecting the PDCCH resource block with a smallest corresponding time-domain symbol as the target PDCCH resource block.

8. The adaptive adjustment method of claim 1, further comprising:

in response to determining that a resource utilization rate of the PDCCH resource pool is less than a second threshold value, re-allocating a UE on a PDCCH resource block that does not have symbol 0 to a symbol in front of the PDCCH resource block that does not have symbol 0, wherein the resource utilization rate is determined based on a number of successfully allocated PDCCH resources in the PDCCH resource pool.

9. The adaptive adjustment method of claim 8, wherein the resource utilization rate is determined based on the following:

acquiring, for each preset period, a total number of the PDCCH resources in the PDCCH resource pool and a total number of the successfully allocated PDCCH resources in the PDCCH resource pool; and determining the resource utilization rate of the PDCCH resource pool within a current preset period based on a ratio of the total number of the successfully allocated PDCCH resources to the total number of the PDCCH resources.

10. An adaptive adjustment apparatus for downlink control channel resources, comprising at least one processor and a memory configured to achieve communication connection with the at least one processor, wherein the memory stores instructions that are executed by the at least one processor; and the instructions, when executed by the at least one processor, cause the at least one processor to:

determine a number and positions of physical downlink control channel (PDCCH) resource blocks in a PDCCH resource pool;

in response to determining that PDCCH resources are allocated to a user equipment (UE), determine a target PDCCH resource block from the PDCCH resource pool based on the number and positions of the PDCCH resource blocks and a size of a resource demand load;

allocate the target PDCCH resource block to the UE; and notify the UE of a time-domain symbol corresponding to the target PDCCH resource block through a search space, wherein the notifying the UE of a time-domain symbol corresponding to the target PDCCH resource block through a search space comprises:

determining the search space configured for the UE; and configuring a value of monitoringSymbolsWithinSlot in the search space based on the time-domain symbol corresponding to the target PDCCH resource block.

11. A non-transitory computer-readable storage medium, having computer-executable instructions stored thereon, wherein the computer-executable instructions are used for causing a computer to:

determine a number and positions of physical downlink control channel (PDCCH) resource blocks in a PDCCH resource pool;

in response to determining that PDCCH resources are allocated to a user equipment (UE), determine a target PDCCH resource block from the PDCCH resource pool based on the number and positions of the PDCCH resource blocks and a size of a resource demand load;

allocate the target PDCCH resource block to the UE; and notify the UE of a time-domain symbol corresponding to the target PDCCH resource block through a search space, wherein the notifying the UE of a time-domain symbol corresponding to the target PDCCH resource block through a search space comprises:

determining the search space configured for the UE; and configuring a value of monitoringSymbolsWithinSlot in the search space based on the time-domain symbol corresponding to the target PDCCH resource block.

12. The adaptive adjustment method of claim 1, wherein the resource demand load comprises resource demands of allocated UEs on the PDCCH resource blocks.

13. The adaptive adjustment method of claim 2, wherein at least one of the following:

a length of time-domain symbol of the first PDCCH resource block is the same as a length of time-domain symbol of the second PDCCH resource block; or a length of time-domain symbol of the first PDCCH resource block and a length of time-domain symbol of the second PDCCH resource block are different.

14. The adaptive adjustment method of claim 2, wherein time-domain symbols corresponding to the first PDCCH resource block and the second PDCCH resource block are adjacent.

15. The adaptive adjustment method of claim 8, wherein a preset period of the resource allocation failure rate and a preset period of the resource utilization rate are the same.

16. The adaptive adjustment method of claim 15, the preset period of the resource allocation failure rate and the preset period of the resource utilization rate are calculated simultaneously.

17. The adaptive adjustment method of claim 1, further comprising:

initializing a number of allocated UEs of each PDCCH resource block before the PDCCH resources are allocated to the UE.

18. The adaptive adjustment method of claim 17, further comprising:

updating the number of the allocated UEs of each PDCCH resource block according to an allocation situation of the each PDCCH resource block.

19. The adaptive adjustment method of claim 8, further comprising:

updating the resource allocation failure rate and the resource utilization rate of the PDCCH resource pool within each preset period.

* * * * *